UNITED STATES PATENT OFFICE.

SANFORD E. LORING, OF CASTLETON, VERMONT, ASSIGNOR TO THOMAS A. JOHNSTON, OF BOSTON, MASSACHUSETTS.

POROUS PENETRABLE TILE FOR PLASTERING, &c.

SPECIFICATION forming part of Reissued Letters Patent No. 10,030, dated February 7, 1882.

Original No. 156,361, dated October 27, 1874. Application for reissue filed October 8, 1881.

*To all whom it may concern:*

Be it known that I, SANFORD E. LORING, a citizen of the United States, residing at Castleton, county of Rutland, State of Vermont, have invented certain new and useful Improvements in Porous Penetrable Tiles for Plastering, &c.; and I do hereby declare the following to be a full, clear, and exact description of the invention, such as will enable others skilled in the art to which it appertains to make and use the same, of which the following is the specification.

This composition is made of clay, as a base, without the addition of sand mixed with variable proportions of coke, ashes or pumice, limes, plaster or cement, coal, wood, charcoal, reeds, straw, or other vegetable and combustible material.

One composition which I have used with good results consists simply of a compound of clay and sawdust in the proportions of forty to sixty of the latter material. The ingredients are pulverized, mixed with water to form a plastic body, then molded into the required form, and burned in kilns, like bricks or other earthenwares. In the burning, the combustible matter is wholly or partially destroyed and removed from the body, leaving the incombustible materials in a porous, spongeous form, similar to pumice-stone. The spaces left by the material destroyed in the burning provide places for the particles of earthy matter that in ordinary wares would be filled, and resist the progress of nails, screws, or rivets, but which may be driven into or through this material for the purpose of securing it to a ground of wood, iron, or other material without readily fracturing this ware. These spaces also greatly increase the suction of the body, and increase its value as a ground-work for receiving cements and mortars and as a filtering material.

I am aware that coal, bitumen, &c., have been combined with clay to assist in burning the ware. To this I make no claim; but I do not know, nor do I believe, that combustible and non-combustible materials have before been used to make an earthenware body that could be readily pierced with nails, screws, bolts, rivets, &c., and thus attached to wood, iron, or other frame-work. To secure this result with the least possible weight of material has been my aim, securing at the same time extraordinary porosity, non-conductability, and, what I think has never before been achieved for brick or earthenware, penetrability, in the sense that the material may be readily punctured.

The spongeous or porous earthenware, brick or terra-cotta, or artificial pumice-stone hereinbefore described may be used instead of or in combination with brown mortar or cements as a ground for receiving plaster or other wall finish, and for covering columns, beams, girders, floors, and walls of wood or iron, or of wood and iron, to protect the same from the action of heat or cold, or, in combination with fire-proof cements or paints, from moisture.

Having thus described my invention, what I desire to secure by Letters Patent is—

1. A method of rendering walls, columns, beams, girders, floors, and roofs fire or water proof by applying (as a substitute for other and ordinary methods and material used for plastering and deadening sounds, &c.,) porous and penetrable earthenware or terra-cotta directly to or around the constructive framework and securing it in any suitable manner, then to be afterward covered with plaster, cement, paint, or other suitable finish or water-proof covering.

2. In the construction of water-proof walls, floors, roofs, &c., the combination of iron, wood, or combined iron and wood with spongeous or porous and penetrable earthenware and a water-proof cement, paint, or other water-proof coating or covering, fastened together in a suitable manner.

3. In the construction of fire-proof columns, beams, walls, floors, and roofs, the combination of iron, wood, or combined iron and wood with porous and penetrable earthenware or terra-cotta, the earthenware covering the columns or other parts of the structure and secured to or around them in any suitable manner.

SANFORD E. LORING.

Witnesses:
H. E. LODGE,
F. CURTIS.